Aug. 31, 1948.   D. D. GRIEG   2,448,027
STATIC REDUCING PULSE RECEIVER
Filed Nov. 23, 1943
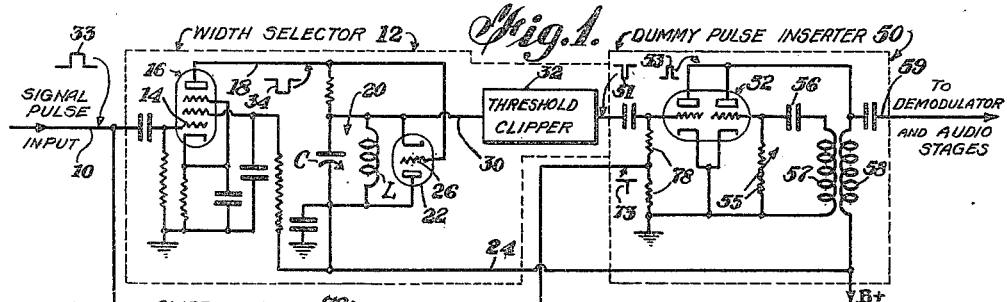
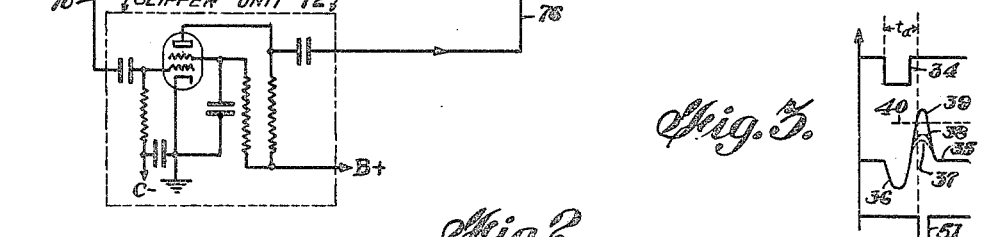
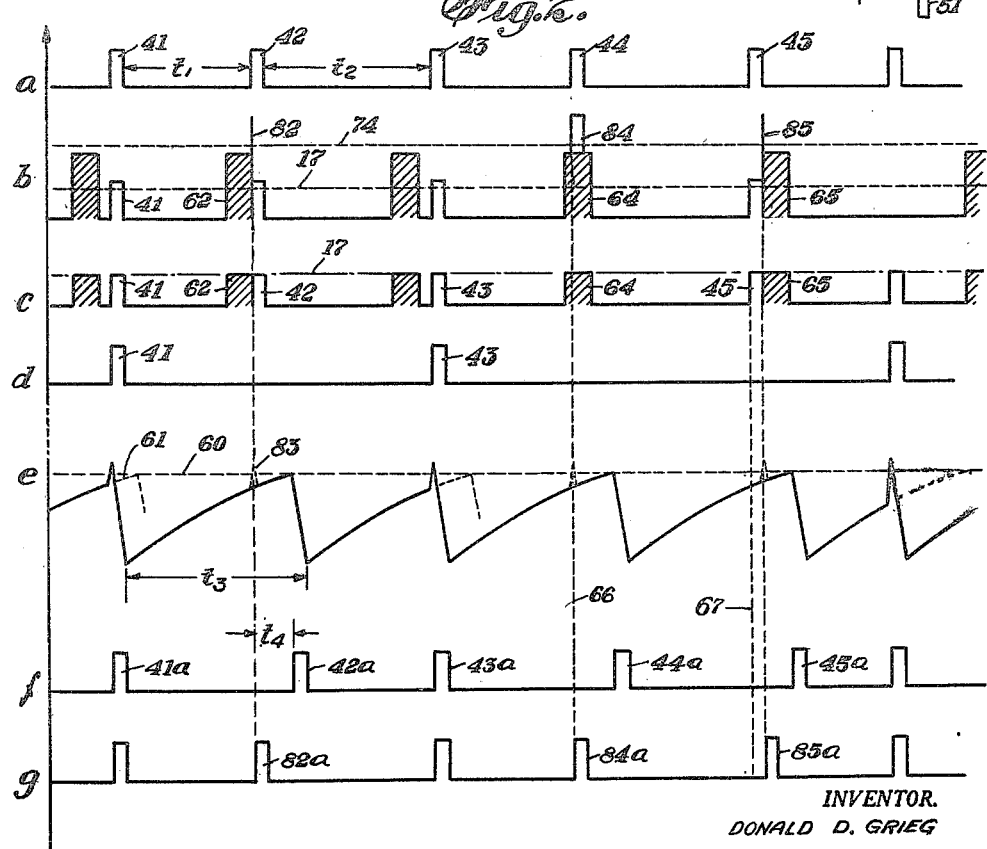
INVENTOR.
DONALD D. GRIEG
BY
ATTORNEY Patented Aug. 31, 1948

2,448,027

UNITED STATES PATENT OFFICE 2,448,027

STATIC REDUCING PULSE RECEIVER

Donald D. Grieg, Forest Hills, N. Y., assignor to Federal Telephone and Radio Corporation, New York, N. Y., a corporation of Delaware Application November 23, 1943, Serial No. 511,404

8 Claims. (Cl. 250—20)

This invention relates to radio receivers and more particularly to a system for minimizing interference in reception of electrical signal pulses whether the signal pulses are time modulated, that is modulated in time displacement, or frequency modulated.

In T. M. (time modulation) and F. M. (frequency modulation) pulse receiving systems, severe interference may be experienced with unsynchronized jamming pulses unless special precautions are taken. These precautions may include blocking between pulses, amplitude and build-up time discrimination, width or time duration selection and others, the methods being used either separately or in combination. All these means serve to remove the jamming pulses occurring at different instants of time than the signal pulses and thus substantially reduce the interference occurring between signal pulses.

Not all the interference is eliminated by these methods, however, since ordinarily no distinction between the jamming pulse and the intelligence pulse can be made when the pulses coincide in time. Practically, the interference experienced during the coincidence of pulses may be sufficient to jam the pulse receiver system even though an efficient blocking system between pulses is used.

It is an object of this invention to provide a method and means to reduce interference of signal pulse reception caused by interference pulses coinciding or overlapping with the signal pulses.

Another object of the invention is to provide a method and means to not only remove signal pulse distortion caused by interference pulses coinciding or overlapping with the signal pulses, but also to replace the interfered signal pulse with a dummy pulse of similar shape and timing; and as a further object to control the timing of the dummy pulse so as to give it, in most instances, substantially the same time position as the signal pulse it replaces.

According to the principles of the invention, the interference to signal pulse reception caused by interference pulses overlapping certain of the signal pulses is reduced by passing only pulses of a given width corresponding to the width of the signal pulses, and by substituting dummy pulses for those signal pulses that are suppressed because of distortion due to the overlapping interference. It will be understood that without the substitution of dummy pulses the omission of signal pulses due to interference would otherwise produce a beat effect at the frequency difference of the pulse rates of the signal pulses and the interference pulses. The removal or suppression of the complex pulse shapes caused by the overlapping, of course, reduces considerably the interference, but due to the periodic omission of such pulse shapes an interference tone or hum results.

The insertion of dummy pulses in approximately the location of the signal pulses suppressed because of distortion removes most of this interference hum. The remaining interference component, however, may be further minimized by giving the dummy pulse substantially the same time position as the signal pulse it replaces. This is accomplished by first clipping the distorted signal pulse so as to obtain a composite pulse substantially equal in width to the amount of the overlap between signal and interference pulses, and then using the timing of the composite pulses to control the timing of the dummy pulses. These composite pulses, for the most part, have one edge, either the leading or the trailing edge, in coincidence with an edge of the signal pulse, so that by timing the occurrence of the dummy pulse with one or the other of the edges of the composite pulse, the dummy pulse is given the position of the modulated signal pulse.

For a further understanding of the invention, reference may be had to the following detailed description to be read in connection with the accompanying drawings, in which:

Fig. 1 is a schematic wiring diagram of the interference limiting circuit portion of a signal receiver according to my invention; and Figs. 2 and 3 are graphical illustrations used in explaining the operation of the interference limiting circuit of Fig. 1.

Referring to Figs. 1 and 2 of the drawing, a train of signal pulses together with interference pulses occurring on the same wavelength are applied from the usual I. F. and detector stages of the receiver circuit to the input connection 10 of the interference limiter circuit. Curve $a$ shows a typical train of T. M. pulses, curve $b$ shows a train of jamming pulses some of which overlap certain of the T. M. pulses, and curve $c$ illustrates the same pulses of curve $b$ limited to a given amplitude. It will be understood, of course, that the interference shown in curve $b$ is for purposes of illustrating different overlapping conditions of the pulses, and that while the interference pulses are shown to be wider than the signal pulses, they may be the same or even narrower although usually they are wider in actual practice.

The pulse width selector 12 of the interference limiter circuit may comprise any known form of circuit capable of passing pulses of a selected width and to suppress all other pulses of greater and lesser widths. The pulse width selector chosen for purposes of illustration is of the character disclosed in the copending application of E. Labin and applicant, Serial No. 487,072, filed May 15, 1943, now Patent No. 2,440,278 granted April 27, 1948. The train of signal and interference pulses such as indicated by curve $b$ is applied to the grid 14 of a limit clipping tube 16. The limit clipping operation of the tube limits all input pulses to substantially the same amplitude as indicated by the level 17 on curves $b$ and $c$. These constant amplitude pulses are passed over anode connection 18 for shock excitation of the LC circuit 20 for producing damped oscillatory waves. The condenser C is adjusted to tune the circuit for producing oscillations the period of which is twice the duration of the signal pulse to be passed by the circuit. Connected across the circuit 20 is a vacuum tube 22 the cathode and anode connections of which are connected to opposite ends of the inductance L. The circuit is provided with a suitable positive source of current through connection 24. The grid 26 of the tube 22 is connected to the plate connection 18.

The energy output of the anode connection 18 produced in response to the application of an input pulse to the grid 14 is applied to the grid 26 at the same time the circuit 20 is shock excited thereby so as to keep the damper tube 22 in open circuit condition for the duration of the input pulse. The undulations produced by the circuit during application of this anode energy are taken off through connection 30 for application to a known threshold clipping amplifier 32, the details of which may be the same as clipper 72, to be described hereinafter.

Assuming that the input pulse 33 to the grid 14 is positive, the anode pulse energy 34 (Fig. 3) corresponding thereto will be negative because of the 180° inversion produced by the tube 16. The leading edge of pulse 34 shock excites the circuit 20 initiating an oscillation represented by the undulation 36. The trailing edge of the pulse 34 shock excites the circuit 20 in the opposite direction just as the undulation 36 passes from negative to positive thereby adding to the energy thereof as indicated by the broken lines 37 and 38 to produce an initial positive undulation 39 following which the tube 22 conducts to damp out all further tendency of the circuit to oscillate as indicated at 35. The clipping operation of the tube 32 is indicated by the level 40 thereby obtaining the peak portion of the undulation 39. As will be readily apparent, changes in the width of the pulse input from the given width of pulse 34 will cause the shock excitation produced by the trailing edge to oppose the oscillatory energy produced by the leading edge, the difference in width of the input pulse from the width of pulses 34 determining the degree of this opposing action. It has been determined by tests that the width selector circuit of this character distinguishes between input pulses where they vary in width by a very slight amount, so that pulses of slightly greater or lesser width than the width for which the circuit 20 is adjusted are suppressed, that is, the positive undulations resulting therefrom do not exceed the clipping level 40. For further description of the pulse width selector reference may be had to the aforesaid application Serial No. 487,072.

From the foregoing description of the pulse width selector 12, it will be understood that the wider interference pulses of curve $b$ and the signal pulses which are overlapped by the interference pulses are suppressed by the width selector function. This will result in the passing of signal pulses as indicated by the curve $d$, the signal pulses 42, 44 and 45 being suppressed because of the interference therewith by the interfering or jamming pulses.

It will be noted that the output pulses of selector 12 are delayed a certain amount with respect to the corresponding input pulses. This delay is indicated at $t_d$ in the graph of Fig. 3. The delay $t_d$ is equal to the width of the desired pulse plus a fraction of the pulse width depending on the clipping level 40 of clipper 32. In the graph of Fig. 2 this delay has not been indicated, other than by the broken line between curves $c$ and $d$, in order to preserve an alignment for simplicity of illustration between corresponding parts of the different curves. Further, this delay, insofar as output pulses of clipper 32 (curve $d$) and the output pulse energy of clipper unit 72 (above level 74, curve $b$) are concerned, is preferably compensated in the circuit 70, 72, 76 hereinafter described.

As hereinbefore stated this operation of suppressing those signal pulses which are distorted in width by jamming pulses reduces the interference but at the same time produces a beat frequency hum in the receiver due to the frequency difference between the rate of the two series of signal and interference pulses. This beat frequency component, however, is materially reduced according to my invention by the insertion of a dummy pulse in place of the suppressed signal pulses in the approximate position of such signal pulses. The dummy pulse inserter 50 may comprise a form of multivibrator but preferably is of the form of a blocking oscillator such as indicated in Fig. 1. The grid, plate and cathode electrodes at the left hand portion of tube 52 constitute a coupling tube by which the negative output pulse 51 is inverted to a positive pulse 53. The electrodes at the right hand portion of tube 52 form a part of the oscillator circuit which includes a time constant control 55, capacitance 56 and regenerative coupling coils 57 and 58 whereby plate current flowing in coil 58 produces a corresponding flow in coil 57 of the grid circuit.

The control resistance 55 of the dummy pulse inserter is adjusted so as to provide a free running period $t_3$, curve $e$, which equal to or slightly greater than the maximum time interval permitted betweeen signal pulses. In the case of T. M. pulses having a given normal bias the pulses are set off by pairs as indicated by the time intervals $t_1$ and $t_2$. The biased T. M. pulses are to be distinguished from T. M. pulses which are symmetrically timed with zero bias. The free running period for proper operation of the oscillator should be greater or at least equal to the maximum permitted interval between successive pulses taking into account differences of time displacement due to modulation.

In the case of F. M. pulses such as are obtainable from an F. M. carrier wave after such wave has been clipped and translated into signal pulses, the free running period of the oscillator is adjusted to equal at least the maximum time interval permitted between successive signal pulses determined according to the limits of modulation.

Referring to curve $e$ of Fig. 2, the wave thereof represents the grid voltage of the oscillator and $t_3$ represents its free running period. The signal pulse 41 which is passed by the width selector triggers the oscillator prior to its normal triggering operation as determined by the triggering level 60 and as indicated by the broken line extension of the grid curve at 61. The oscillator produces by proper adjustment an output pulse 41a which corresponds to the signal pulse 41. The next signal pulse 42, however, is distorted by an interference pulse as indicated at 62, thereby increasing its width so that the circuit 12 suppresses it. The suppression of the pulse 42, therefore, permits the oscillator to complete its free running period whereby a dummy pulse 42a is produced displaced by an amount $t_4$ from the timing position of the signal pulse 42. This positioning of the dummy pulse while not accurate with respect to the timing of signal pulse 42, nevertheless fills in the gap due to the suppression of the distorted signal pulse thereby reducing the beat frequency hum hereinbefore referred to.

The next succeeding signal pulse 43 triggers the oscillator to produce pulse 43a which corresponds to the timing position of the signal pulse 43. Signal pulses 44 and 45, however, are distorted by interference pulses as indicated at 64 and 65 so that they are suppressed thereby permitting the oscillator to complete its free running period in both instances thereby producing dummy pulses 44a and 45a. These two pulses as indicated by their displacement with respect to the timing positions 66 and 67, respectively, operate here to reduce the beat frequency hum.

According to a further feature of my invention, the dummy pulses replacing the supressed signal pulses 42, 44 and 45 can be made to even carry substantially the time modulation of these signal pulses. This is accomplished by applying the input pulses such as indicated by curve b over connection 70 to a clipper unit 72 of known form whereby the signal input is threshold clipped along the level 74 indicated in curve b. This threshold clipping results in securing that portion of the composite pulse energy of amplitude level above the clipping level produced by the overlap between the interference and signal pulses. The signal pulse 42 has the leading edge portion thereof slightly overlapped by the interference pulse thereby producing a composite pulse portion 82 (curve b) which extends above the threshold clipping level 74. This composite pulse energy clipped by unit 72 is applied as a negative pulse 73 over connection 76 to a voltage divider circuit 78 to the input grid connection of the dummy pulse inserter 50.

This composite pulse energy 73 operates to trigger the oscillator as indicated at 83 (curve e) thereby producing an output pulse 82a (curve g) which has a time position corresponding substantially to the time position of the signal pulse 42. It will thus be seen that the pulse 82a carries substantially the time modulation of pulse 42.

The distortion of signal pulse 44 as indicated at 64 in curve b produces a composite pulse 84 which is of the same width and timing as the signal pulse 44 since in this instance the interference pulse completely overlaps the signal pulse. Thus, the composite pulse portion 84 obtained by clipping unit 72 triggers the oscillator to produce an output pulse 84a which corresponds accurately with the timing of the signal pulse 44.

In the case of signal pulse 45 which has a trailing edge portion thereof overlapped by interference pulse 65 a composite pulse 85 is produced which corresponds in its timing to substantially the trailing edge of the signal pulse. This composite pulse 85 triggers the oscillator to produce a pulse 85a having the timing corresponding to the leading edge of the composite pulse 85. In this instance the timing of pulse 85a does not correspond exactly to the timing of pulse 45 but as will be seen by comparing it with dummy pulse 45a it is a substantial improvement thereover. Moreover, if the signal pulse is narrow the discrepancy will be extremely small.

While the illustrations shown in Fig. 2 show the composite pulses and the signal pulses to trigger the oscillator according to the leading edge of the triggering pulse, it will be readily apparent that by differentiating the composite pulses passed by the clipper unit 72, the dummy pulse inserter may be made to respond to either the leading or the trailing edge of the composite pulse whichever is desired. In some instances, it may be desirable to arrange the system so that it may be switched to improve reception from one triggering condition to the other since the series of jamming pulses may overlap more frequently the trailing edge of the signal pulses than the leading edge thereof or vice versa.

The output pulses of the circuit 50 include the pulses shown in curve f when clipper unit 72 is omitted and the pulses shown in curve g when the clipper unit is included as shown in Fig. 1. The output pulses of connection 59 in either case are applied to the usual demodulator and audio amplifier stages.

While I have described above the principles of my invention in connection with specific apparatus, and particular modifications thereof, it will be clear to those skilled in the art that many changes may be made without departing from the invention. It will also be readily apparent that this system may be used in conjunction with other pulse discriminating circuits, and particularly with blocking systems where the interference pulses are substantially the same width as the wanted signal pulses. It will therefore be clearly understood that the specific illustrations and description are made only by way of example and not as a limitation on the scope of my invention as set forth in the objects and the accompanying claims.

I claim:

1. A method of reducing interference to reception of electrical signal pulses of a given width caused by interference electrical pulses of widths different from said given width or overlapping said signal pulses to form composite pulses of widths differing from said given width, comprising suppressing pulses differing in width from said given width, and substituting dummy pulses for those signal pulses suppressed because of distortion due to the overlapping thereof by interference pulses.

2. The method defined in claim 1 wherein the operation for substituting dummy pulses for composite pulses includes clipping the distorted signal pulse to obtain a composite pulse substantially equal in width to the amount of overlap between signal and interference pulses, and controlling the time position of the dummy pulses according to the time position of one of the edges of said composite pulse.

3. The method defined in claim 1 wherein the signal pulses are modulated in a manner wherein the time intervals between successive pulses differ between two given limits according to the intelligence with which the pulses are modulated and the operation of substituting dummy pulses for those composite pulses suppressed because of interference distortion includes timing the dummy pulses to occur at intervals at least as great as the maximum of said two given limits.

4. A system for reducing interference to reception of electrical signal pulses of a given width caused by electrical interference pulses of widths different from said given width, or overlapping said signal pulses to form composite pulses of widths differing from said given width, comprising pulse width selector means to pass pulses of said given width only, a pulse generator coupled to the output of said width selector for producing output pulses at a repetition rate in which the time interval between successive pulses produced is equal to substantially the maximum time interval occurrable between successive signal pulses in the absence of pulses from said width selector, and bias means in said generator responsive to pulses from said width selector to control the timing of said generator according to the occurrence of the pulses passed by said pulse width selector means.

5. The system defined in claim 4 in combination with means for clipping the signal pulses to obtain a composite pulse substantially equal in width to the amount of overlap between signal and interference pulses, and means to apply said composite pulses to said pulse generator to control the timing of the generator operation in the absence of signal pulses from said pulse width selector means.

6. The system defined in claim 4 wherein the pulse selector means includes a resonant circuit, means to apply the train of signal and interference pulses to said circuit for shock excitation according to the timing of the leading and trailing edges of the pulses of said train, the oscillations initiated by the edges of each pulse combining to form an initial undulation, means to damp out the oscillations normally following said initial undulation so that the oscillations produced by one pulse will not affect the oscillations produced by the next succeeding pulse, and means for threshold clipping only the undulations produced by those pulses of a duration equal to substantially one-half of the period of the frequency to which said resonant circuit is tuned.

7. The system defined in claim 4 wherein the pulse generator includes a blocking oscillator and means for adjusting the normal running cycle of the oscillator to a period substantially equal to the maximum interval occurrable between successive signal pulses.

8. A system for reducing interference to reception of electrical signal pulses of a given width caused by electrical interference pulses of widths different from said given width or overlapping said signal pulses to form composite pulses of widths differing from said given width, comprising pulse width selector means to pass pulses of said given width and to suppress pulses differing from said given width, and a pulse generator coupled to the output of said width selector and controlled in frequency by the pulses of said given width for substituting a dummy pulse in approximately the position of each suppressed composite pulse.

DONALD D. GRIEG.

REFERENCES CITED

The following references are of record in the file of this patent:

UNITED STATES PATENTS

| Number | Name | Date |
|---|---|---|
| 2,151,778 | Landon | Mar. 28, 1939 |
| 2,153,202 | Nichols | Apr. 4, 1939 |
| 2,157,677 | Runge | May 9, 1939 |
| 2,181,309 | Andrieu | Nov. 28, 1939 |
| 2,251,677 | Holmes | Aug. 5, 1941 |
| 2,286,450 | White et al. | June 16, 1942 |
| 2,294,341 | Moore | Aug. 25, 1942 |
| 2,344,697 | Hollingsworth | Mar. 21, 1944 |
| 2,381,928 | Roberts | Aug. 14, 1945 |